United States Patent [19]

Tulpule

[11] Patent Number: 4,623,997
[45] Date of Patent: Nov. 18, 1986

[54] COHERENT INTERFACE WITH WRAPAROUND RECEIVE AND TRANSMIT MEMORIES

[75] Inventor: Bhalchandra R. Tulpule, Vernon, Conn.

[73] Assignee: United Technologies Corporation, Hartford, Conn.

[21] Appl. No.: 681,166

[22] Filed: Dec. 13, 1984

[51] Int. Cl.⁴ .............................................. H04J 3/00
[52] U.S. Cl. ........................................ 370/85; 370/91
[58] Field of Search ...................... 370/85, 86, 91, 99

[56] References Cited

U.S. PATENT DOCUMENTS

| 4,205,200 | 5/1980 | Parikh et al. | 370/91 |
| 4,227,178 | 10/1980 | Gergaud et al. | 370/91 |
| 4,345,325 | 8/1982 | Gandini et al. | 370/91 |
| 4,547,880 | 10/1985 | DeVita et al. | 370/85 |
| 4,568,930 | 2/1986 | Livingston et al. | 370/85 |
| 4,574,375 | 3/1986 | Kemp et al. | 370/85 |

Primary Examiner—Douglas W. Olms
Assistant Examiner—Kenneth I. Rokoff
Attorney, Agent, or Firm—Francis J. Maguire, Jr.

[57] ABSTRACT

An interface for use between an asynchronous bus and a signal processor is disclosed. The interface utilizes both a wraparound receive and transmit memory to ensure coherency with very little processor overhead.

2 Claims, 12 Drawing Figures

COHERENT INTERFACE WITH WRAPAROUND RECEIVE AND TRANSMIT MEMORIES

CROSS REFERENCE TO RELATED APPLICATIONS

The invention described herein may employ some of the teachings disclosed and claimed in commonly owned copending application filed on even date herewith by Tulpule et al Ser. No. 681,172, entitled APPARATUS FOR INTERFACING BETWEEN AT LEAST ONE CHANNEL AND AT LEAST ONE BUS, and by Tulpule et al Ser. No. 681,151, entitled INTERFACE WITH WRAPAROUND RECEIVE MEMORY.

TECHNICAL FIELD

This invention relates to a remote terminal interface that guarantees the coherency of data transfers between an asynchronous bus and a subsystem interfaced thereto.

BACKGROUND ART

In a system having a plurality of subsystems which are functionally integrated via an asynchronously operating bus, a need for data coherency arises. In such a system a bus controller normally communicates with up to a certain number of remote terminal interfaces which individually interface the bus with a related subsystem. For example, in a MIL-STD-1553 context, the bus controller can communicate with up to 31 remote terminal interfaces. All of the remote terminal interfaces (RTI's) are capable of communicating with one other at the behest of the bus controller. There is a potential problem in such a system of the subsystems' CPUs obtaining incoherent data blocks or messages. A coherent message is one in which the data or parameters refer to a unique computation performed on a unique data set and belonging to a unique time frame. Incoherency involves the transmission and/or use of partial, i.e., incoherent messages made up of data belonging to different time frames, computations, or data sets. For example, an RTI can receive a message consisting of many words from the bus, can store that message, and can begin to overwrite or update the stored information while the host CPU is still in the process of reading the previously written message. In other words, the RTI is updated in midstream with new information before the old information can be transferred completely to the CPU. Thus, the CPU can receive, for example, the first half of the message from one time frame while the second half of the message is from a different time frame. If the bus is used for interfacing with critical avionics subsystems, where highly accurate and coherent information is critical, such incoherency can have disastrous consequences.

One of the prior art methods of attacking this problem is to create a double buffering type situation in which the messages received are alternately placed in one of two memory buffers. While a first message is occupying the first memory buffer a second message can be received in the second memory buffer. Thus a small amount of time is sacrificed for ensuring coherency. However, if a burst of information is transmitted on the asynchronous bus to the particular RTI, the double buffering solution may not be successful in retaining all the transmitted information. If the CPU can respond in a timely manner, this method can ensure coherency. However, in the majority of high performance subsystems communicating with a bus, the CPU is quite busy performing other tasks and cannot respond to a burst of messages or block transmissions using the same message label. Thus, some data will be lost if the transfer rate is greater than the rate of acceptance capabilities of the double buffering architecture. Of course, it is conceivable that a system designer could set up a triple, quadruple, quintuple, or any number of buffering architectures. However, this would be extremely expensive because of: (a) the necessity of designing each buffer in such a way that it can accept a full block (there are 32 words in MIL-STD-1553B block) thus ensuring considerable waste of memory for messages containing less than the full number of words for a block; (b) the need for updating, in a rapid and orderly manner, the "addresses" of the last "tenants" of the first buffer each time a new message is received into the first buffer; (c) the buffering type solution requires a great deal of hardware and CPU throughput; and, (d) the need for interrupting the CPU everytime new information is shifted into the last available buffer.

A second level of coherency problems exists in the prior art. Each data word within a message belongs to a unique time frame. However, if two or more messages are received by the RTI at different times but are buffered and read out by the host CPU at the same time, the problem of time consistency between such critical messages arises.

Thus an inexpensive and simple means of insuring data coherency and time consistency is desirable.

DISCLOSURE OF INVENTION

The object of the present invention is to provide an Asynchronous Bus Remote Terminal Interface having both receive and transmit wraparound memories which ensures data coherency and time consistency with minimum hardware and software penalties on the host subsystem.

According to the present invention, a memory buffer, for storing received message blocks which has much larger memory capacity than anything that could conceivably be effectively utilized by the host during a sequence of received message blocks, stores each received word into the next sequentially available memory location in a "stack" of memory locations organized in "circular buffer", "wraparound", or "pseudo-FIFO (first-in, first-out)" fashion. As subsequent message words are received, they are written or packed sequentially regardless of subaddress (message number), starting with the very next available memory location without wasting any spaces. In other words, if a command word from the bus controller is received indicating that the message to follow contains two data words, then that message would only occupy a total of three word spaces in the stack (the command word and the two data words). The very next command word received is loaded into the very next available adjacent, i.e., the fourth, location and its data words are stored immediately thereafter. Each time a message block is completely written into the stack, a stop pointer is set to the memory address in the stack that was filled by the last data word in the message block. The host CPU is algorithmically unaware of any incompletely stored message blocks beyond the stop pointer. Thus, the RTI receives message blocks in sequence and writes these blocks into the stacks in sequence until the memory is completely filled up. At that point, the RTI "wraps around" to the beginning of the memory again, overwriting the very first message block written into the stack. But by this time, the host CPU will already have accessed the overwritten data. In parallel with this activity, the host CPU is permitted to read out any number of correctly received messages starting with the first message indicated by a start pointer and ending with any block up to the RTI controlled stop pointer. Each stored message remains in the same location until it is overwritten. Received message coherency is thus achieved due to the dynamic separation of the message "write" area for the RTI from the "read" area for the CPU, regardless of the message subaddress. The circular memory technique also permits the storing of string messages or block data transfers into sequential slots. The need for rapid CPU response to prevent overwriting is eliminated as long as the size of the memory is much larger than anything that could conceivably be effectively utilized at any one time by the host CPU. In the MIL-STD-1553 context, 1K words of memory provides storage for over 20 milliseconds of received data in worst case burst mode. This represents sufficient storage for 20 milliseconds of continuous 1553 transmission or 32 blocks containing 32 words each.

In further accord with the present invention, a memory buffer for storing message blocks for transmission on the asynchronous bus is utilized by the host CPU to store each word for transmittal into a predefined message block area. Each message block has the capitcity to store a selected number of words. The selected number is great enough to contain at least several messages. Each message block is organized in wraparound fashion similar to the receive memory buffer except that each block is a smaller version of the receive memory buffer. Coherency of transmit data is assured, for example, by allowing the host CPU to read the RTI status register to determine if the RTI is busy transferring and if so, to determine the subaddress of the transmit message block. The host CPU will reschedule the transfer of the data to the RTI if a conflict is indicated. A semaphore flag is set when the CPU reads this status which inhibits data reads by the RTI. The semaphore flag is cleared when the CPU writes the first data word to the transmit memory block. The CPU then continues through the block, easily staying ahead of the RTI, which reads at only 20 microseconds per word. This technique eliminates the need for use of the MIL-STD-1553 "busy bit" which can have a devestating effect on bus throughput. The CPU provides a new start pointer for the RTI after a first data word is written for a new message so that any new RTI request will read new data. The RTI reads the start pointer only once per bus request to transmit. It stores the start pointer in a separate internal counter and addresses all subsequent words in the message in relation to the contents of the counter. Once the RTI copies the RTI start pointer for the message into its counter the RTI start pointer can now be updated by the CPU at will, without affecting what the RTI transmits. I.e., the last previous message pointed to by the previous value of the RTI start pointer will be transmitted by the RTI. If there is a conflict, i.e., the RTI reads and CPU writes at the same time then, depending on the priorities selected, either the old message (RTI wins) or a new message (CPU wins) will be transmitted.

According to a second aspect of the present invention, each message stored in both receive and transmit memory buffers are optionally time tagged before placement in the stack. A time tag clock is used to put a time tag on each of the receive or transmit messages. The time tag is used by the host CPU or the destination CPU to compare the different reception times of any two received messages. Using other information available to the particular CPU, the parameters can then be interpolated or extrapolated for removing time skew and achieving time coherency as well as increased performance in terms of parameter accuracy and integrity across many messages.

Receive and transmit data coherency is assured by the present invention by the management and absorbtion of each individual block received and transmitted over an asynchronous bus on a block by block basis in wraparound memory. This technique avoids many of the inefficiencies associated with buffer architectures used in the prior art and also FIFO architectures which have similar access inefficiencies. Time consistency of received and transmitted message blocks is assured by time tagging the blocks. Thus, the present invention may be used to enhance critical subsystem integration by guaranteeing data coherency without imposing significant software or hardware penalties on the host CPU.

These and other objects, features, and advantages of the present invention will become more apparent in light of the detailed description of a best mode embodiment thereof, as illustrated in the accompanying drawing.

BEST MODE FOR CARRYING OUT INVENTION

Figure 1:
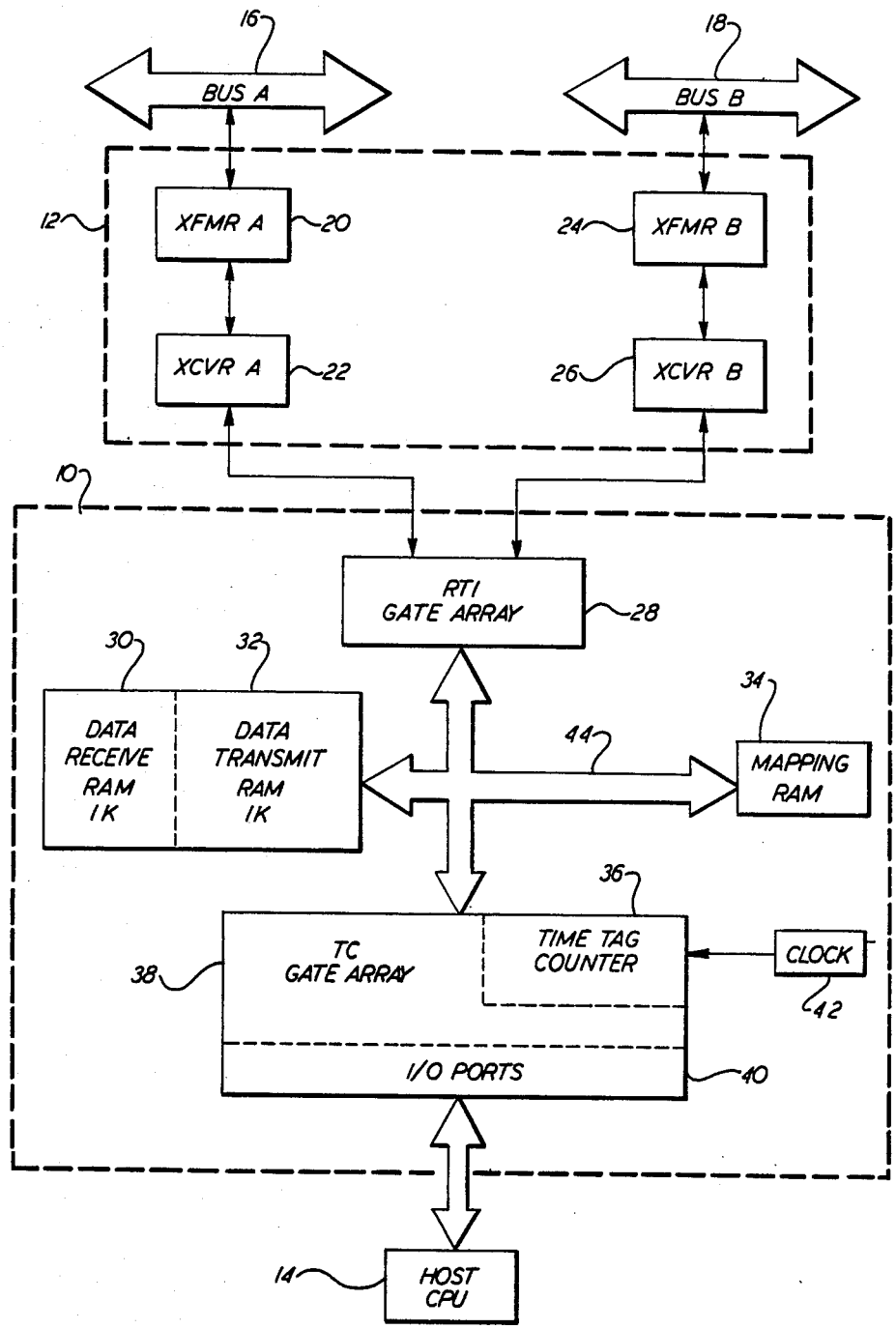
FIG. 1 is a simplified functional block diagram of the generic remote terminal interface according to the present invention.

Referring to FIG. 1, a functional block diagram of a generic MIL-STD-1553 remote terminal interface 10 (RTI) according to the present invention, is shown. The generic RTI 10 is shown interfacing with a bus interface unit 12 and a host CPU 14. It should be understood that the bus interface unit could be incorporated into the generic RTI 10 rather than being provided separately. The bus interface unit 12 interfaces with a pair of dual redundant MIL-STD-1553 busses, designated as bus A 16 and bus B 18. The bus interface unit 12 includes transformer A 20 and transceiver A 22 which together serve the function of interfacing the RTI's digital logic with the data bus. The coupling transformer 20 may include fault isolation resistors where required for a connection to the data bus. The transceiver 22 includes a receiver which provides low level noise rejection and a digital output compatible with the digital logic. The transceiver 22 also includes a transmitter which drives the bi-phase modulated signal to form data word formats defined in the military standard. Both the transformer and the transceiver portions are widely available packaged either separately or together.

The bus interface unit 12 also includes a transformer B 24 and a transceiver B 26 which serve the same functions for bus B 18 as transformer A 20 and transceiver A 22 do for bus A 16. Dual redundant bus interface units 12 are also commercially available. Although the invention is shown in FIG. 1 in the context of a dual redundant MIL-STD-1553 bus, it should be understood that the invention can be practiced in the context of any asynchronous bus system, single, double, and so on.

The generic RTI 10 includes a remote terminal interface (RTI) gate array 28, a data receive RAM 30, a data transmit RAM 32, a mapping RAM 34, a time tag counter 36, a terminal controller (TC) gate array 38, an I/O section 40, a clock 42, and I/O and control buses 44. It should be understood that the RTI gate array 28 and the TC gate array 38, while shown separately, could as easily be incorporated into a single gate array without departing from the spirit and scope of the invention. Similarly, many of the other constituent blocks shown in the generic RTI 10 of FIG. 1 can be provided separately or included into the generic RTI 10 of FIG. 1.

The RTI gate array 28 may be implemented as a CMOS device. As disclosed in co-pending application U.S. Ser. No. 635,944 entitled DUAL REDUNDANT BUS INTERFACE CIRCUIT ARCHITECTURE, invented by G. Howland, assigned to the assignee of this application, and hereby expressly incorporated by reference, the RTI gate array 28, as contemplated herein, handles the complete MIL-STD-1553 protocol and requires no CPU intervention for normal transfers of blocks between the operative bus and the host CPU. Key features of the 1553 RTI gate array as disclosed in the Howland specification include:

single device support for dual redundant 1553 buses;
minimum installation board area and power requirements;
minimum hardware and software support requirements;
operational status reporting and programming capability; and
comprehensive self-test capability.

The 2K word data RAM is partitioned into a 1K word receive data RAM 30 and a 1K word transmit data RAM 32. The RTI gate array 28 deposits command words, mode words, and data words into the receive data RAM in blocks, and retrieves deposited blocks from the transmit RAM 32 for transmission on the active bus. The receive data RAM 30 is organized as a "wraparound" RAM memory by means of control signals from the TC gate array 38. This wraparound organization, shown in FIG. 2, consists of blocks in the sequence in which they are received. As each message is received by the RTI gate array 28, it is packed and time tagged by the TC gate array 38. There are no intermessage spaces for messages even for messages of less than 32-word length. The organization of the transmit data RAM, has 32 blocks of 256 words each. Each block is set up in wraparound fashion similar to the set-up of the receive RAM except there are 32 separate wraparound RAMs (see FIG. 6).

The mapping RAM 34 of FIG. 1 is initialized by the host CPU 14 and is used by the RTI gate array 28 and the TC gate array 38 to validate incoming transmissions and determine the appropriate response (e.g., interrupts) to the host CPU 14 or the bus controller (not shown).

The time tag counter 36 is a free running time counter which is cleared or preset by the TC gate array 38 on receipt of the synchronize mode codes from the bus controller. The time counter is used by the TC gate array 38 to time tag all incoming and outgoing blocks.

The TC gate array 38 is the central element of the generic RTI interface 10. The functions of the TC gate array 38 are as follows:

data coherency management
formating and packing
CPU interface
mode code response
CPU interrupts.

The TC gate array 38, in concert with the RTI gate array 28, produces all the necessary signals to mechanize the above functions as described in further detail below.

To ensure data coherency, the TC gate array 38 provides logic that tests incoming blocks. The consistency of incoming blocks is readily determined and the host CPU is denied access to incompletely received message blocks. For out-going data destined for the active bus, the TC gate array 38 arbitrates access to the transmit data RAM 32 between the RTI gate array 28 and the host CPU 14. The RTI gate array 28 has higher priority in accessing the transmit data RAM 32 than the CPU 14. Outgoing coherency is guaranteed by means of a block write disable signal generated by the TC gate array (not shown) and by initially denying RTI read access to a block being written into.

The TC gate array 38 provides the control signals and high speed processing capabilities of a state machine necessary to pack and time tag incoming blocks in real time. The formating of complete received blocks and the use of wraparound memory achieves the following important benefits:

efficient use of data RAM
increased data throughput capability
flexibility for variable or multi-rate message blocks
reduced software complexity.

The TC gate array 38 provides the necessary signals and I/O port decodes for interfacing with the host CPU 14 with a minimum amount of software. The TC gate array 38 also generates the addresses of words within each block to minimize CPU 14 real time requirements.

The TC gate array 38 responds to all MIL-STD-1553B mode codes without CPU 14 intervention except for the following two mode codes for which CPU actions are essential:

reset RTI interface
self test.

Of course, it should be understood that these codes could be implemented.

Each time a new complete block is received by the RTI interface, the TC gate array utilizes the mapping RAM 34 to determine the legality and interrupt status of the block. If a valid interrupting message block is received, the CPU is interrupted. The CPU can then access this block through a special I/O port in the TC gate array.

The operation of the MIL-STD-1553B remote terminal interface gate array 28 involves the participation of the interface hardware elements, as well as the host CPU. The functional features of the various elements involved were described above. Simple and efficient software algorithms and procedures can be developed in the host CPU for the acquisition, transmission, and absorption of the active bus data, and for the management of the 1553B RTI.

The tasks performed by the 1553B RTI consists of the following operations:
  receive bus data
  transmit CPU data
  initialization
  self test.

Figure 3:
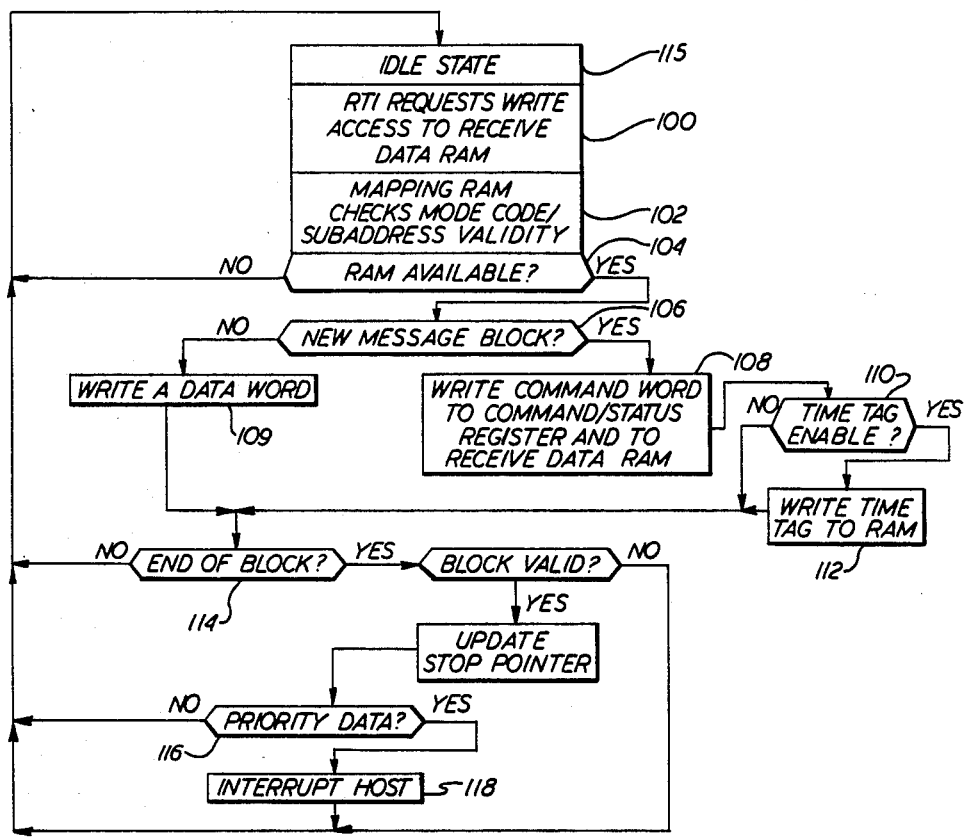
FIG. 3 is a flowchart illustration of a receive data routine.

Reception and processing of data transmissions by the RTI gate array 28 involves the following sequence of operations (an equivalent flowchart description is shown in FIG. 3):

a. RTI gate array requests write access to the data receive RAM 30. (See step 100 of FIG. 3);
b. TC gate array 38 checks the block validity using mapping RAM 34. (See step 102 of FIG. 3);
c. TC gate array 38 checks data receive RAM 30 availability (See step 104 of FIG. 3) with guaranteed access assured before the receipt (every twenty microseconds) of the next word; p1 d. If a new block is being written into the data receive RAM 30 (See step 106 of FIG. 3), the TC gate array 38 writes the command word in the command/status register (not shown) and the receive data RAM. (See step 108 of FIG. 3). If not, a data word is written (See step 109 of FIG. 3);
e. If the time tag feature is enabled, the TC gate array 38 loads the time tag word after the block and updates pointers associated with the wraparound memory which point to specific pieces of data to be described in more detail below. (See steps 110 and 112 of FIG. 3). If the time tag is not enabled, or after writing a time tag, the message is examined to determine if the end of the block has been reached. (See step 114 of FIG. 3);
f. Steps (c.) and (d.) are repeated every twenty microseconds until the block is completely received. The message block is now available to the CPU if valid. (See steps 114, 115, and 100-112 of FIG. 3);
g. The TC gate array 38 generates the interrupt to the host CPU 14 if specified by the mapping RAM 34 and updates special pointers to the interrupting block(s). (See steps 116 and 118 of FIG. 3).

Figure 2:
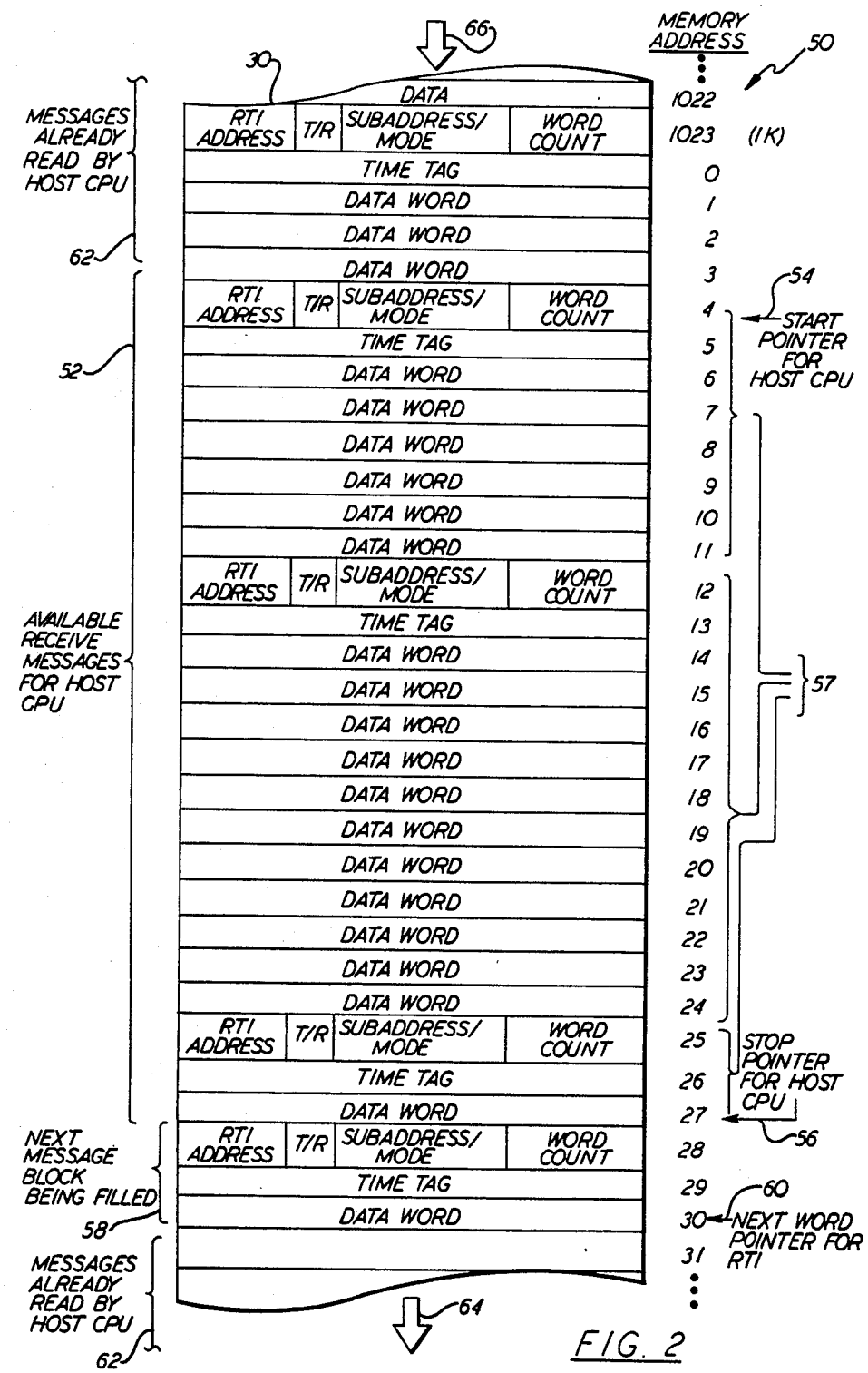
FIG. 2 is an illustration of the memory organization of the receive data RAM of FIG. 1.

Referring back to FIG. 2, an illustration of the memory organization of the data received RAM 30 is shown. Arbitrarily assuming a 1K memory, the memory addresses 50 are shown in a column adjacent to the wraparound data received memory 30. Each memory address is designated in digital format, i.e., 0 through 1023. The memory 30 has a great many more memory address locations for storing words than could possibly be usefully needed at any one time, i.e., worst case storage of over 20 milliseconds. Only a small portion of the total memory is illustrated in FIG. 2. The part of the memory 30 being actively used at the time illustrated in FIG. 2 is indicated by a bracket 52 indicating that words deposited in memory address locations 4 thru 27 are available for CPU usage. The host CPU can determine this by examining a start pointer 54 and a stop pointer 56 which point respectively to the beginning and end of the available message blocks. Only those blocks 57 which have not yet been read, and which have been completely written are made available for CPU usage.

Figure 4:
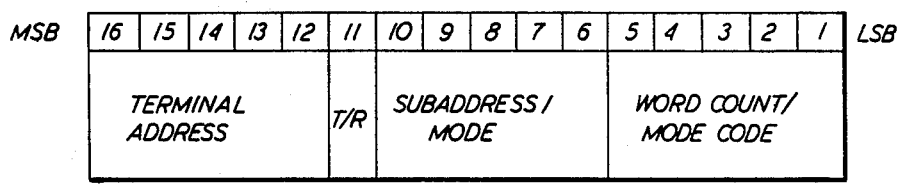
FIG. 4 is an illustration of the command word format.

The command word format is illustrated in FIG. 4. Each RT in the 1553 system is assigned a unique 5 bit address for which it is responsible to respond when the address is transmitted as part of a command word on the data bus by the bus controller. The next bit indicates the action required of the RT, i.e., transmit (T) or receive (R). The next 5 bits indicate either the subaddress identification of specific message blocks or an indication that a mode command is being transmitted. The next five bits indicate the quantity of data words to be sent out or received by the RT or an optional mode code.

Referring back to FIG. 2, the next block being filled is indicated by a bracket 58 and includes, at the instant of time illustrated, the memory location addresses 28 thru 30. A next word pointer 60 is used by the TC gate array 38 of FIG. 1 to determine where to write the next word in the block. In this case, the next word will be written in memory location address number 31 which contains an old or "stale" piece of information that was formerly contained in a block already read by the host CPU as indicated by a bracket 62. The TC gate array 38 will continue to write blocks into the next available section of memory according to the next work pointer 60 and the host CPU 14 will continue to read these blocks either singly or in groups at its convenience. The TC gate array 38 will thus always stay slightly ahead of the host CPU and will always complete the writing of a block, thus ensuring its coherency, before it is read by the host CPU. In this way the memory is written in wraparound fashion as indicated by an arrow 64 until the physical limitations of the memory are exhausted as indicated by an arrow 66. At this point the 1K capacity of the memory is about to be exhausted.

After writing into the memory location at address 1,023 the next word pointer 60 simply jumps to memory address number 0 again. And the block being written "wraps around" the physical boundaries of the 1K memory. Since the memory capacity is much larger than could ever be contemplated for use at any one time, there is never any coherency problem.

Thus a "circular", "wraparound", "stack", or "pseudo-FIFO" type of memory which is much larger than anything that could be conceivably utilized at any one time is used to ensure message coherency on a block by block basis. By writing blocks sequentially in a packed format and leaving each word in its original location, very efficient access techniques are made available for use. Thus, the old techniques of double, triple, etc. buffering or FIFO type memory storage, where messages "ripple" through the stack, are avoided. Thus, data coherency is ensured in a very stable manner which ensures access with minimum hardware and software requirements. The CPU is able to unload one or more blocks and sort out the blocks according to their command words.

The second level of coherency problems that exist (due to the reception of data from two different subsystems in a group of received messages) is solved by time tagging each message. Thus the CPU is able to determine precisely when each was received. Thus, if a flight control computer sends an airspeed signal at time $t=t_1$ and a gyro computer sends pitch, roll, and yaw signals at time $t=t_2$, both of these signals will be loaded into the stack and time tagged so that the CPU will be able to distinguish them time-wise and not utilize them as if they were all generated at the same time. Since they are time tagged, potentially disatrous timing problem concerning the time frame in which a data word is received, are avoided. The CPU compares the different reception times of any two received blocks using other information available to it concerning how the aircraft operates and then extrapolates any lagging piece of data to the updated time of the latest piece of information.

Figure 5B:
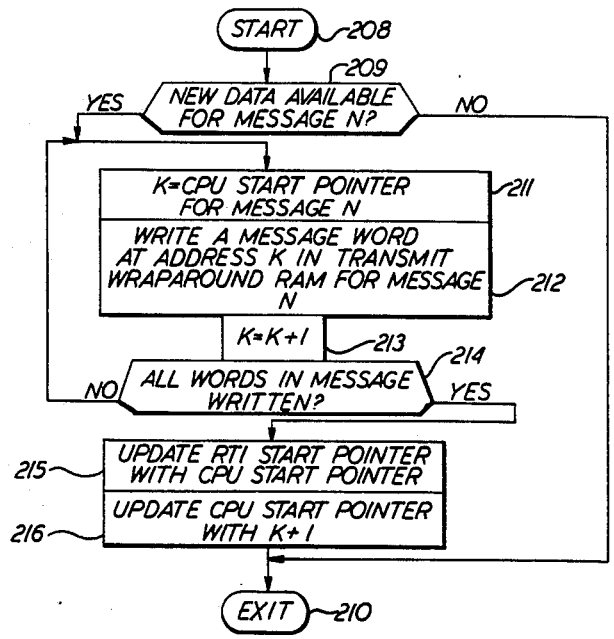
FIG. 5B is a flowchart illustration of a CPU transmit RAM update sequence for message No. N.
Figure 5A:
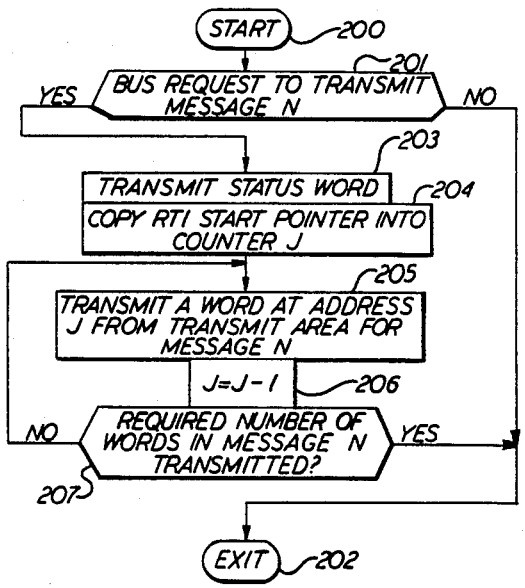
FIG. 5A is a flowchart illustration of an RTI transmit routine for message No. N.

FIG. 5A is an illustration of an RTI transmit sequence for message NO. N. From a start block 200 the sequence progresses to a step 201 in which a determination is made as to whether a bus request to transmit message N exists or not. If not, an exit is made in a step 202. If so, a status word is transmitted in step 203 and the current RTI start pointer is copied into a J counter in a step 204. A word is then transmitted at address J from the transmit area for message N. J is then set equal to $J-1$ in a step 206. A decision is then made in a step 207 as to whether the required number of words in message N have been transmitted. If not, a return is made to step 205 for further transmission of additional words. If so, an exit is made in step 202.

Coherency is maintained in the above sequence because the RTI copies the RTI start pointer for a message into a counter. The RTI start pointer can then be updated by the CPU at will without affecting what the RTI transmits, i.e., the last previous message pointed to by the previous value of the RTI start pointer. If there is a conflict, i.e., the RTI reads and the CPU writes at the same time then, depending on who wins (based on the selected priority), either the old message (RTI wins) or new (CPU wins) will be transmitted.

FIG. 5B is an illustration of a CPU transmit RAM update sequence for message No. N. From a start block 208 is decision is made in a step 209 as to whether new data is available for message No. N. If not, an exit is made in a step 210. If so, a variable K is set equal to the CPU start pointer for message N in a step 211. A message word is then written at address K in transmit wrap-around RAM for message N in a step 212. A step 213 is then executed in which the variable K is set to $K+1$. A determination is then made in a step 214 as to whether all words in the message have been written. If not, a return is made to steps 211-213 until all the words have been written. If so, the RTI start pointer is updated with the CPU start pointer in a step 215. The CPU start pointer is then updated to the value $K+1$ in step 216. An exit is then made in step 210.

Coherency is maintained in the above sequence illustrated in FIG. 5B because:
the RTI start pointer is updated after the
(a) the RTI start pointer is updated after the data is written so that any new request will be new data;
(b) the RTI reads the start pointer only once per bus request to transmit and stores that value is a separate internal counter. It then reads all words in the message using that pointer as a reference. Any new start pointers are ignored until the next bus request.

Figure 6:
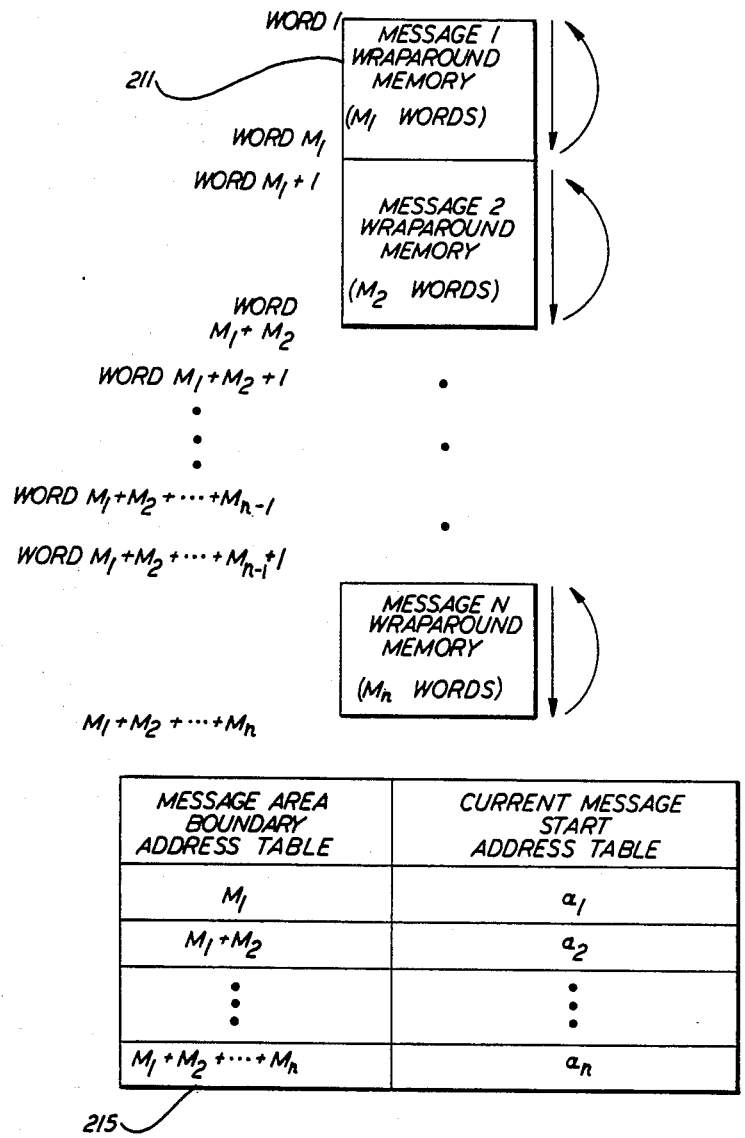
FIG. 6 is an illustration of the memory organization of the transmit data RAM.

FIG. 6 is an illustration of the transmit RAM structure. Typically, there would be 30 message blocks (in a MIL-STD-1553 context) each of the blocks might contain 256 words and each block constitutes a separate wraparound memory. A message area for message No. 1 211 is shown having $M_1$ words. The most current message within the message No. 1 memory area begins at an address $a_1$. The CPU will keep area 211 updated with the latest data and the latest start pointer will point to the latest data for transmittal. In similar fashion, message No. 2, 3, 4, . . . , N will have message areas bounded as shown, each having a current message start address as shown in the table 215 of FIG. 6.

Figure 7:
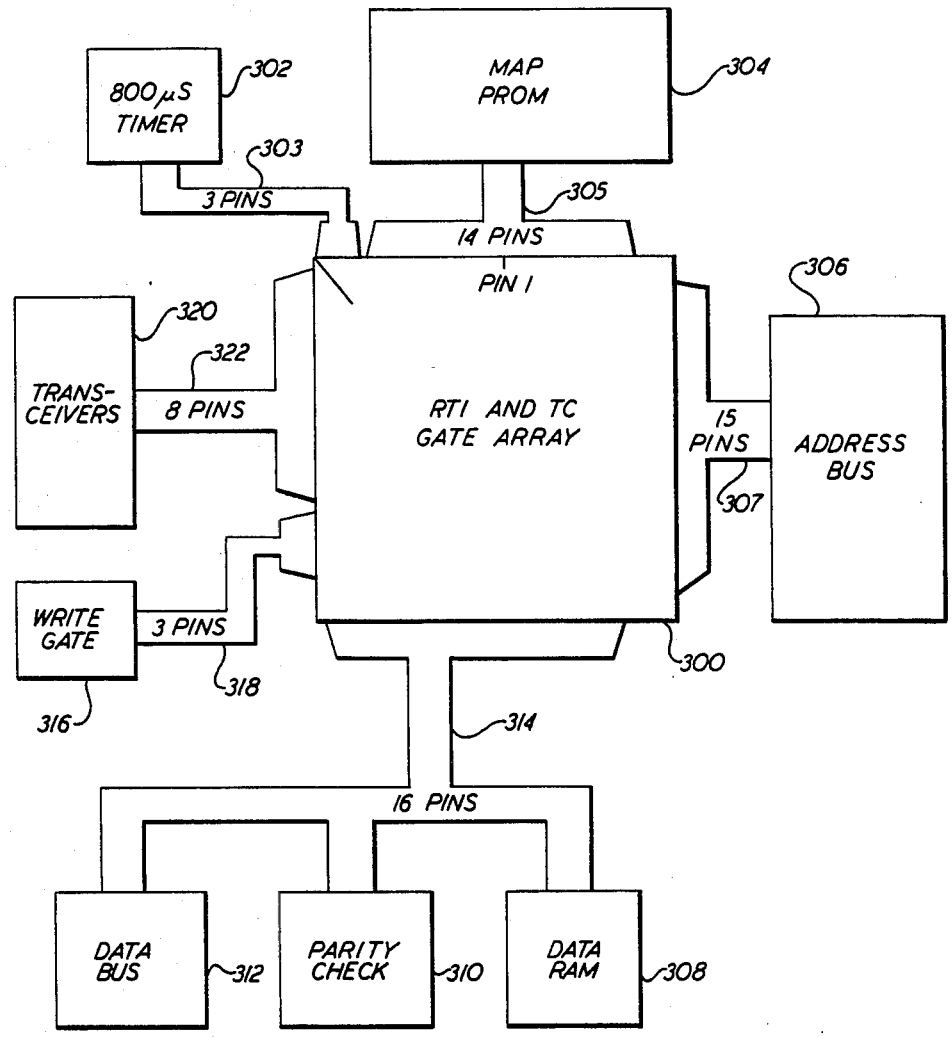
FIG. 7 is an illustration of a gate array incorporating RTI and TC functions and is shown interfaced to various external devices.

FIG. 7 is an illustration of a gate array 300 incorporating both the RTI and TC functions. The gate array physical orientation and major connections are shown. It should be understood that the orientation shown is merely one of a great variety of orientations that could be chosen. It should also be understood that the devices and major connections made through the gate array are not all necessarily required in carrying out the inventive concepts disclosed herein. Nor should the invention be limited by the physical limitations of the individual devices.

FIG. 7 illustrates an 800 microsecond timer 302 connected to the gate array 300 on three lines 303, a MAP PROM 304 connected to the gate array 300 by fourteen lines 305, an address bus 306 connected to the gate array by fifteen lines 307, a data RAM 308, a parity check section 310, and a data bus 312 all three connected by sixteen common lines 314 to the gate array 300, a write gate 316 connected by three lines 318 to the gate array 300 and, transceivers 320 connected by eight lines 322 to the gate array 300.

The 800 microsecond timer 302 serves the function of protecting the bus from a rogue RTI which continues to send signals on the bus after its maximum allotted time has expired. Given that the longest transmission cannot last for more than 800 sec per MIL-STD-1553, this time limit was chosen. The timer is started each time the bus "talks" to the RTI and permits the RTI to "talk" on the bus for a maximum of 800 sec after which the transceivers 320 are disabled. Thus, the timer 302 limits the maximum transmission time on the bus to 800 sec.

The MAP PROM 304 serves the same function as the mapping RAM 34 of FIG. 1. Either a RAM or ROM may be used to accomplish this function. In an application where the host processor may wish to redefine a message during operation as legal or illegal, valid to receive or not valid, valid to interrupt or not valid, and valid to time tag or not, then a RAM with its associated host processor access path should be used. In a more typical system that does not require redefinition of these parameters during operation, the simpler PROM implementation may be used.

The address bus 306 serves the function of sharing the data RAM's address between the RTI and TC array and the host processor, and also decoding the host processor address to provide it access to the internal registers of the RTI and TC array.

The data RAM 308 serves a function similar to the data receive RAM 30 and the data transmit RAM 32 of FIG. 1.

The parity check section 310 is provided to generate and store the parity bit associated with each word in the data RAM during a data RAM write. Parity is again generated during a data RAM read and compared to that stored during the write of that same word. A disagreement between these two indicates a RAM fault and is flagged to the host processor as such. Parity check is a reliability-fault detection enhancement without which the interface will function but with lower reliability.

The data bus 312 serves the function of providing a data transmission path between the gate array 300 and a host CPU interfaced thereto and also between each of these devices and the data RAM 308.

The write gate 316 is provided to synchronize the RTI and TC gate array accesses to the data RAM to those of the host processor, thus providing a transparent DMA mode of operation. This makes the shared data RAM function effectively like a dual-ported RAM.

The transceivers 320 perform a similar function as the transceivers 22, 26 of FIG. 1.

Figure 8:
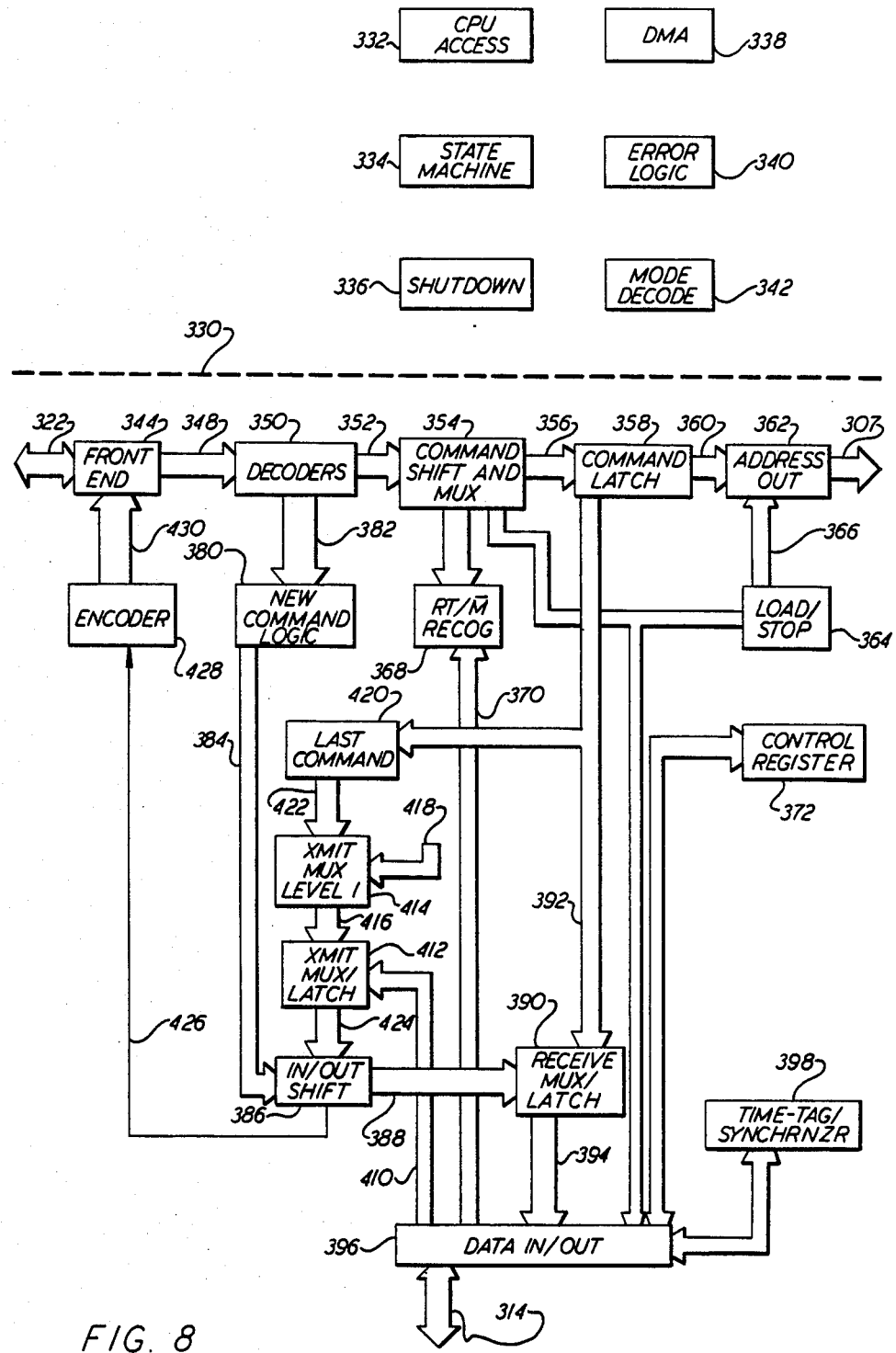
FIG. 8 is a simplified functional schematic block diagram illustration of the control and data sections of the RTI and TC gate array of FIG. 7.

FIG. 8 is a simplified functional block diagram illustration of the control and data sections of the RTI and TC gate array 300 of FIG. 7. Each of the blocks illustrated in FIG. 8 illustrate in general form the hardware which may be incorporated in the gate array 300. The majority of the functions disclosed in FIG. 8 have already been disclosed in the copending Howland application previously incorporated by reference. The changes that have been made are changes which enlarge the capabilities of the Howland RTI by incorporating a TC which helps to ensure the data coherency which is the chief object of the present invention.

FIG. 8 is divided by a dotted line 330 which separates the functional blocks into an upper control section and a lower "data" section. The upper control section illustrates six functional blocks which contain control logic having overall control of the flow of data illustrated in the lower data section of FIG. 8. A CPU access section 332 contains logic which allows the CPU to communicate with the gate array. This logic decodes the appropriate input signal indicative of the CPU's "intentions", i.e., addresses, read/write, chip select and internal selects 1 and 2 allows the CPU to access registers internal to the RTI and TC gate array such as time tag, control and stop pointer registers.

A state machine section 334 includes the top-most control logic which ties the operation of the generic interface together. It is similar in function to the state machine disclosed by Gary Howland in the above referred to DUAL REDUNDANT BUS INTERFACE CIRCUIT ARCHITECTURE disclosure. The state machine interprets the action that must take place, i.e., write command word, write data word, read data word, write time tag, etc., and creates the necessary control signals required for that action to occur.

A shutdown logic section 336 is provided to detect shutdown commands from the bus and to take appropriate action. Whenever a shutdown command is detected, the transmitter associated with the opposite half of the dual redundant 1553 bus is disabled per the military specification.

A DMA sectioon 338 arbitrates bus level access to the local RAM between the host CPU and the RTI utilizing the synchronization signals provided by the external write gate circuit. The DMA section abritrates access to the data RAM's address and data lines creating what appears to both users as a dual-port RAM.

An error logic section 340 is included to detect errors in the 1553 serial stream. All of the checks required by MIL-STD-1553 are performed. These include word parity, contiguous data, gap times, word counts, invalid modes, synch patterns, etc.

A mode decode section 342 is provided to recognize mode commands which are capable of execution in the particular embodiment. All 1553 defined mode codes are decoded and implemented within the gate array except Reset Remote Terminal and Perform Self Test which must be passed on to the CPU for execution.

The data section of FIG. 8, below the dotted line 330, includes a conceptual presentation of the flow of data within the gate array 300 of FIG. 7, according to the present invention.

A front end section 344 includes level translation, a debouncing section, and also provides a test path similar to the self test aspect disclosed in the Howland disclosure previously incorporated by reference. The front end section 344 receives Manchester encoded data on lines 322 and also provides Manchester coded output.

After level translation, debouncing and other appropriate tests, the bi-phase signals are transmitted on lines 348 to a decoder section 350 which decodes the incoming Manchester signal. The decoders may be dual decoders in a dual redundant implementation. The decoded signals are transmitted on lines 352 to a command shift and multiplexer section 354. The shift section changes the incoming serial data to parallel form and the multiplexer section is used in dual redundant implementations to select the proper incoming channel.

The multiplexed parallel command word is transmitted on lines 356 to a command latch section 358 where it is latched for later transmission.

The latched command word is transmitted on lines 360 to an address out section 362 which provides an address on lines 307 to the address bus 306 of FIG. 7. The address out section 362 is a multiplexer which selects between the command latch 358 and a load pointer provided by a load/stop section 364. When the interface is transmitting data the data is formatted in the data RAM 308 (see FIG. 7) such that the address to the RAM is the lowest eleven bits of the command word which has been stored in the command latch (refer to FIG. 4). The lowest five bits of the command latch are a counter which decrements by one for each word transmitted thus producing the data format of FIG. 6. When the interface is receiving data the RAM is addressed by the load pointer on lines 366 and 307 thus producing the receive data format of FIG. 2. Also provided by the load/stop section 364 is a stop pointer, or next word pointer 60 of FIG. 2. After a block is received and has passed all validity checks, the load pointer is copied into the stop pointer thus including the new block into the CPU's valid data area 57 (see FIG. 2). If at any time, an error is detected, the stop pointer is copied into the load pointer which effectively backs up the load pointer and eliminates the invalid data from the CPU's accessable area. It is not necessary to actually erase the invalid data from the RAM. It is in fact written over by the next incoming block and the CPU never sees the invalid data.

All command words on the 1553 bus regardless of destination, are shifted into the command shift register 354. It is from here that an address comparison is made by RT/M recognition logic 368. This is simply a comparison of the command word's five most significant bits (refer to FIG. 4) to addresses which the CPU has written into the RT/M recognition logic over lines 370. If an address matches with the RT address the interface responds as a remote terminal. If an address matches with a monitor address, the interface receives data but does not respond on the 1553 bus. Thus, it will behave as a bus monitor per the military specification. If no match at all is made the interface does nothing. The CPU may also program a "monitor all" in which case the interface will receive any and all bus data without regard to address.

A control register 372 is provided within the gate array which allows the CPU to perform such functions as reset, enable channel A and/or B, enable self-test, enable time tag, etc., by setting the appropriate control register bits.

A new command logic section 380 responds to decoded command, status, and data words on lines 382 from the decoder section 350. Incoming serial data is transferred from the new command logic section 380 on lines 384 to an In/Out Shift Register 386 where they are assembled in parallel form for transmission on lines 388 to a receive multiplexer/latch 390. The receive multiplexer/latch 390 is also responsive to latched command words received on lines 392 from the command latch 358. Thus, the receive multiplexer/latch 390 receives both latched command words and data words in parallel form for transmission on lines 394 to a Data In/Out section 396 which may be a bi-directional tri-state data bus interface for interfacing on lines 314 with the data bus 312, parity check section 310, and Data RAM 308 of FIG. 7. A Time-Tag/Synchronizer section 398 provides time-tag words for each message block for transmission to the receive portion of the data RAM 308 of FIG. 7.

The Time-Tag/Synchronizer has a 16-bit free-running counter which is incremented every 64 microseconds. If the time tag is enabled, this 16 bit count is written into the data RAM in the position indicated in FIG. 2. It is, of course, necessary to sychronize the incrementing of the time tag to the write cycle so that a stable word is written. This is done by postponing the increment until the write is over. The time tag counter is also presetable and is loaded by the CPU (from data lines 314) or upon receipt of a "synchronize with work" mode code from the 1553 bus (from lines 394). Or the time tag counter is cleared when the mode decode logic 342 recognizes a "synchronize" mode code from the 1553 bus.

Thus, in the receive mode, message blocks having a command word followed by a time-tag with a number of data words are transmitted on the lines 314 to the receive data RAM.

In response to a transmit command from the interfaced bus the decoders 350, command shift and multiplexer 354, command latch 358, and address out section 362 will all function in a similar fashion to provide the proper command to the interfaced hardware. In this case, messages stored in the transmit section of the data RAM 308 (see FIG. 7) are transmitted on lines 314 to the Data In/Out Section 396 for transmittal on lines 410 to a transmit multiplexer/latch 412. The transmit multiplexer/latch 412 is also responsive to status words transmitted from a transmit multiplexer level 1 414 on lines 416. The transmit multiplexer level 1 414 receives status words on lines 418 and which are assembled from various sources within the gate array.

A last command section 420 provides a last command signal on lines 422 to the transmit multiplexer level 1 414. The transmit mux level 1 414 multiplexes the contents of the last command section or the status word information into the transmit latch. This provides the data paths to support the "transmit last command" and "transmit status" mode codes of the military standard.

Once a status word and the subsequent data words are received by the transmit multiplexer/latch 412 they are provided on lines 424 to the in/out shift register 386 for serial transmission on a line 426 to an encoder 428. The encoder provides Manchester bi-phase signals on lines 430 for transmission to the front end 344. From the front end 344, the Manchester encoded signals are provided on lines 322 to the transceivers 320 of FIG. 7 for transmission on the associated asynchronous data bus.

Figure 9A:
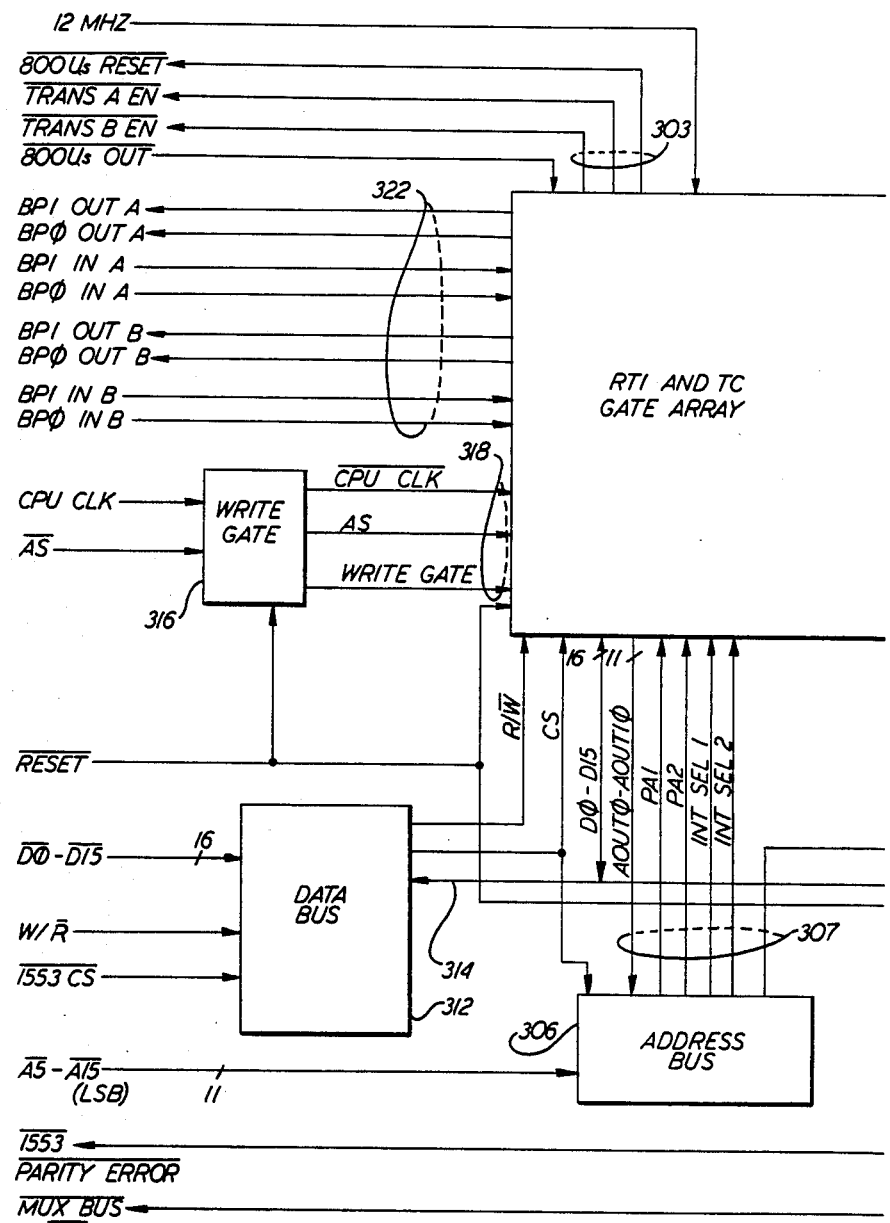
FIGS. 9A-B is similar to FIG. 7 except the individual signals external to the gate array are shown in more detail.
Figure 9B:
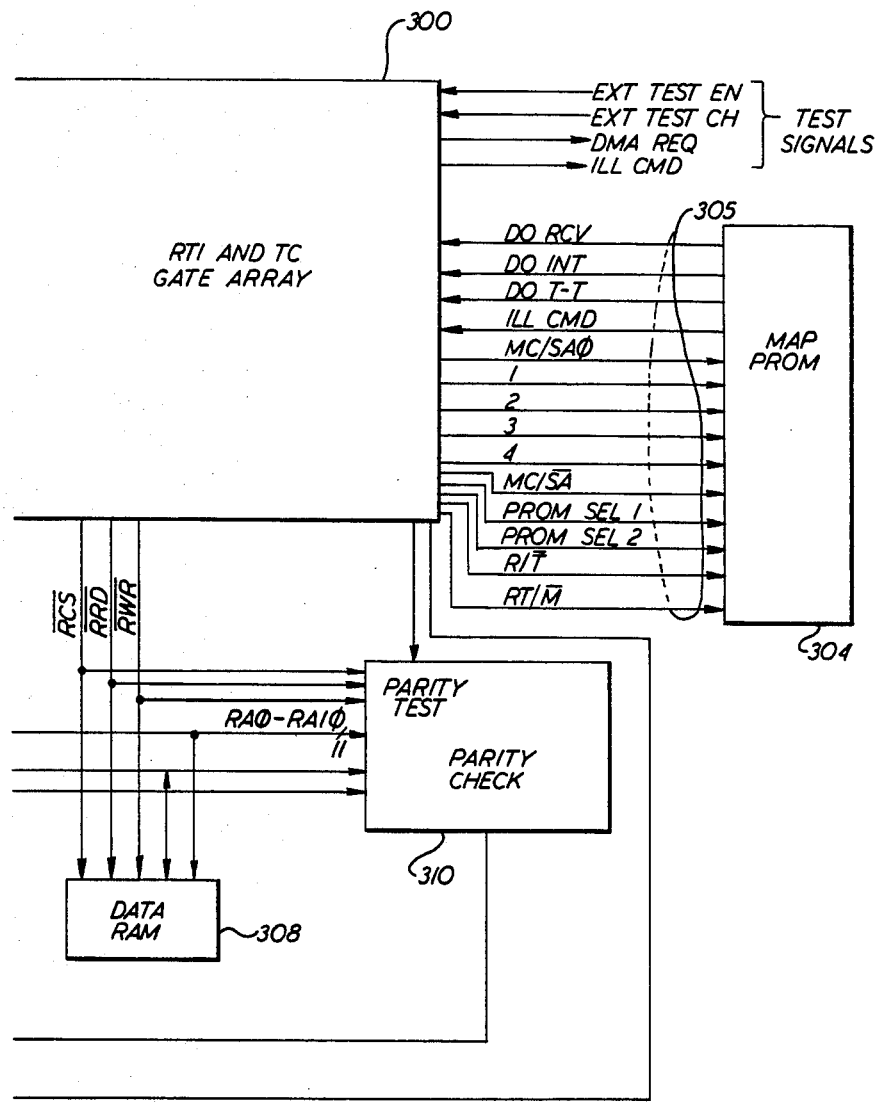
Figure 10:
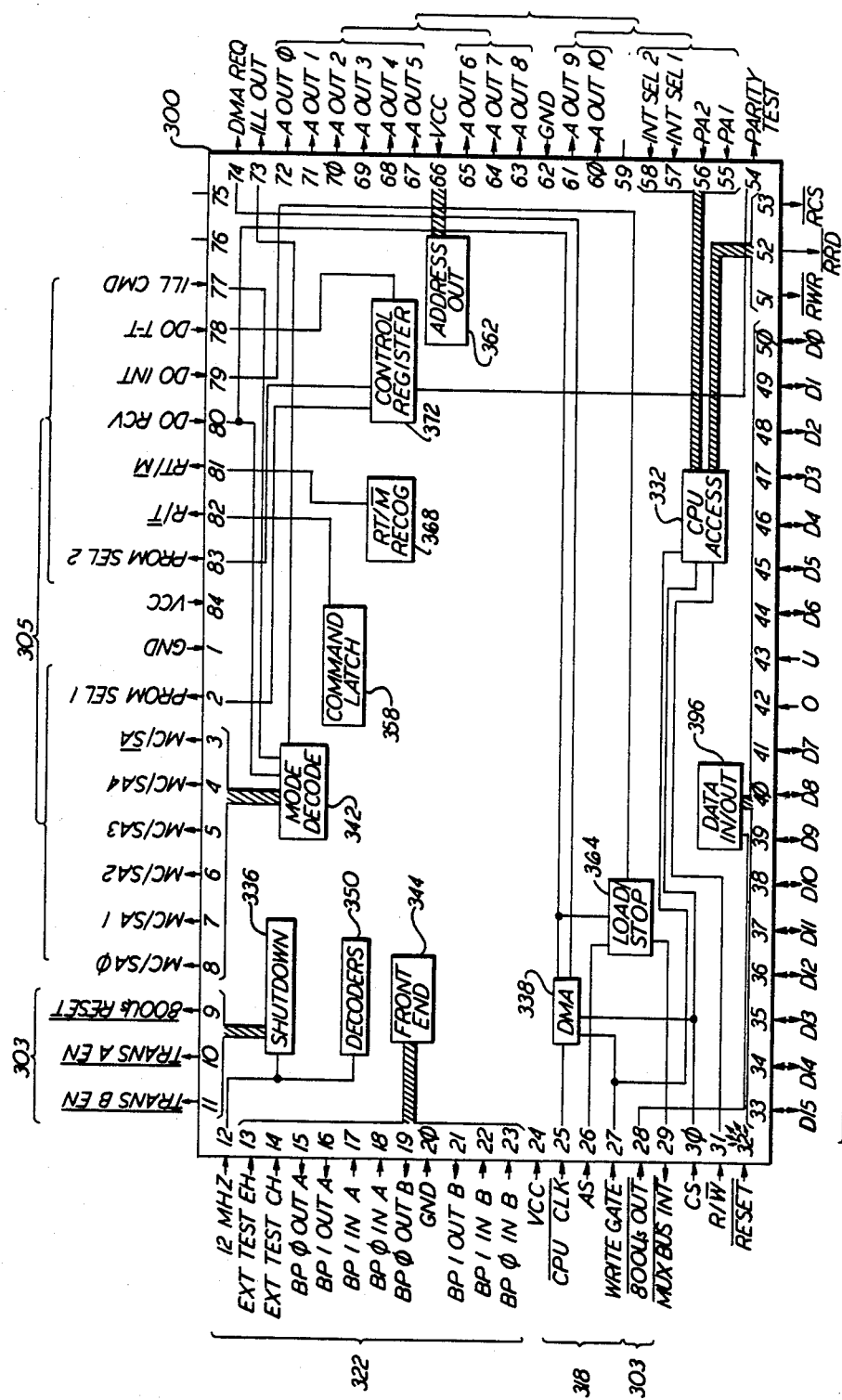
FIG. 10 shows the relationship between many of the functional blocks of FIG. 8 and the external devices of FIG. 9.

A more detailed representation of the signals which interconnect the various sections of the generic interface of FIG. 7 including the signals which interface with the host CPU are shown in FIGS. 9 & 10. Some additional signals, not central to the inventive concepts presented herein, are also shown and will be described in some detail.

FIG. 10 is provided to show the relationship between many of the functional blocks presented in FIG. 8 and an actual hardware implementation as shown in FIGS. 9 & 10. The gate array 300 of FIG. 9 is illustrated in FIG. 10 in a manner which presents several of the functional blocks of FIG. 8 connected to the external signals of FIG. 9. Not shown in FIG. 10 are those blocks in FIG. 8 which are dedicated solely to gate array internal signal processing.

In particular, the signals on lines 322 of both FIGS. 7 & 8 which are connected to the transceivers 320 of FIG. 7 are shown in FIGS. 9 & 10 connected to the front end 344 on pins 13–23 of the gate array 300. The address out section 362 of FIG. 8 is shown in FIG. 10 interfacing with address out lines on pins 60–72 of the gate array 300. The Data In/Out Section 396 of FIG. 8 is shown in FIG. 10 as providing and receiving data on pins 33–50 of the gate array 300.

Various other control and data sections illustrated in FIG. 8 are shown in FIG. 10. Although not shown in FIG. 8 as interfacing with any devices external to the gate array, it will be seen from FIG. 10 that these various other internal functional blocks illustrated in FIG. 8 do in fact interface with external devices as well as internally with each other. Thus, it will be seen that the mode decode section 342, the command latch section 358, the RT/M recognition section 368, and the control register sections 372, all contribute external signals on lines 305 which are provided to the MAP PROM 304 of FIGS. 7 & 9.

The mode decode section 342 provides MC/SA 0–4 and MC/SA signals to the MAP PROM 304 for the purpose of identifying the individual mode code or subaddress being acted upon. This allows that MAP PROM 304 to properly classify each individual command.

The control register 372 provides a PROM SEL 1 signal and a PROM SEL 2 signal to the MAP PROM section 304. The function of these signals is to allow the host CPU to reconfigure the MAP PROM to function in any of four different quadrants.

The RT/M recognition section 368 provides an RT/M signal on pin 81 of the gate array which serves the function of identifying to the MAP PROM 304 whether the command being serviced was the result of a remote terminal address recognition or a monitor address recognition.

Both the mode decode 342 and the DMA section 338 respond to a DO RCV signal received on pin 80 of the gate array from the MAP PROM 304 of FIGS. 7 & 9. If the command has mapped such that DO RCV is active, the interface will write the command (and data if applicable) into RAM. If DO RCV is inactive the interface will not write the message to RAM.

The gate array is also responsive at pin 79 to a DO INT signal which is provided internally to the gate array to the LOAD/STOP section 364. DO INT instructs the gate array to interrupt the host CPU when the message has been processed and written into RAM. This allows for immediate servicing of high priority data.

The gate array is responsive at pin 78 to a DO T-T signal provided to the control register section 372. The function of this signal is to identify messages which require a time tag to be included when they are written to RAM.

The gate array 300 is also responsive at pin 77 to an ILL CMD signal from the MAP PROM. The ILL CMD signal identifies commands which have been defined in the system as illegal. The interface will respond by setting the appropriate errors in its status word. The constitutes a bus error.

The gate array 300 provides a DMA REQ signal at pin 74 from the DMA section 338. This signal is intended for use as a test signal and has no function in the operating system.

An ILL OUT signal is provided as an output on pin 73 of the gate array from the mode decode section 342. This signal is provisional and may be used to either flag or interrupt the host CPU if the host CPU needs to know when a bus error has occurred.

The CPU access section 332 is responsive at gate array pins 55-58 to four signals from the address bus and ultimately from the host CPU. A PA 1 and a PA 2 signal are provided at pins 55 and 56. These are from the host CPU address bus and allow the host CPU to access the various registers internal to the gate array.

The INT SEL 1 and INT SEL 2 signals are provided at pins 57 and 58.

A PARITY TEST signal is provided from the control register as a gate array output signal at pin 54 to the parity check section 310 of FIGS. 7 & 9. The host CPU can set this signal in the control register. The host CPU may write the entire RAM and then read the entire RAM and verify that no parity errors have occurred. The host CPU may then change the parity test bit which goes into the parity generatlon/verification circuit. If the host CPU then reads the RAM, it should find that parity fails at every word. This test would normally be done at power up.

The CPU access section 332 provides three output signals at gate array pins 51-53. These include an RWR signal which is provided both to the parity check section 310 and the data RAM section 308 of FIGS. 7 & 9. This is the write signal for the data RAM 308.

An RRD signal is provided at pin 52 to the parity check 310 and data RAM 308 sections as well. This is the read signal for the data RAM.

Additionally, an RCS signal is provided at pin 53 to both the parity check 310 and the data RAM 308. This is the chip select signal for the data RAM.

The gate array 300 is responsive at pin 32 to a RESET signal from the host CPU. This signal is used throughout the gate array in many different sections to initialize the internal gate array memory elements. RESET is normally issued at power up.

As may be seen from FIG. 9 the RESET signal is utilized by the write gate section 316, the gate array 300 and the parity check section 310. The write gate section 316 utilizes the reset for initialization at power up. The parity check section 310 also uses the reset signal for initialization at power up.

A W/R signal from the host CPU is provided to pin 31 of the gate array and is used in the CPU access section 332 to identify whether the CPU is performing a read or a write cycle.

A CS signal from the host CPU is provided at pin 30 of the gate array and is routed to both the DMA section 338 and the CPU access section 332. The CS signal is used in the DMA section 338 to synchronize DMA cycles to the host CPU cycles for the purpose of performing DMA cycles that are transparent to the CPU.

The CS signal is used in the CPU access section 332 to indicate that the CPU is accessing either the gate array or the data RAM.

The gate array provides a MUX BUS INT signal at pin 29 from the load/stop section 364. This signal interrupts the host CPU at the completion of the message processing if the message has been mapped to be a high priority message by the MAP PROM as indicated by the DO INT signal.

A not 800 s OUT signal is provided on pin 28 from the 800 microsecond timer 302 of FIG. 7. The not 800 s OUT signal comes into the gate array where it can be read by the host CPU. The host CPU can trigger the 800 s timer 302 and then poll not 800 s OUT to verify that the timer is functional. This will normally be done at power up.

The 12 MHz clock provides the basic synchronous clock for the gate array. A best mode embodiment of the generic asynchronous bus remote terminal interface according to the present invention has been described in connection with FIGS. 7-10 implemented using a combined RTI and TC gate array interfaced with a variety of external devices which aid in the interface function. The generic RTI provides guaranteed coherency of messages transferred between an asynchronous serial data bus and a host CPU. It should be understood that the RTI and TC gate array could be implemented using separate gate arrays as shown in FIG. 1. Their functions could also be implemented in discrete components.

Although the invention has been described in the very specific context of a MIL-STD-1553 bus it should be understood that the invention may be practiced as well in any asynchronous bus context.

Similarly, although the invention has been shown and described with respect to illustrated embodiments thereof, it should be understood by those skilled in the art that the foregoing and various other changes, omissions, and additions in the form and detail thereof may be made therein without departing from the spirit and the scope of the invention.

I claim:

1. A bus interface circuit for coherently transferring digital signals as words of a specified number of bits formatted in messages with each message having a specified maximum number of words between a signal processor and an asynchronous serial data bus, comprising:

remote terminal interface (RTI) means, responsive to incoming digital signals in serial form from the serial data bus for transferring said incoming serial signals in parallel form, and responsive to outgoing digital signals in parallel form from the signal processor for transferring said outgoing parallel signals in serial form to the serial data bus;

wraparound receive memory means, responsive to said incoming serial signals in parallel form from said RTI for sequentially storing received messages at successive memory addresses starting at the beginning of said wraparound memory and then continuing regardless of message number until the end of said wraparound memory is reached and then continuing sequential storing at the beginning again of said wraparound memory, said wraparound memory providing read access to stored words to the signal processor;

transmit memory means, having its memory addresses organized in predefined message blocks with each block having a selected number of word storage addresses greater than the specified maximum number in a message each block for storing more than one message, each block organized for utilization as a separate wraparound transmit memory responsive to said outgoing parallel signals from the signal processor for sequentially storing message words at successive memory addresses starting at the beginning of a wraparound transmit memory block and then continuing until the end of said block is reached and then continuing sequential storing at the beginning again of said block, read access to each of said blocks to said RTI being confined to a signal processor specified completed message in the block; and terminal controller (TC) means, responsive to said incoming serial signals in parallel form from said RTI for providing start and stop addresses of complete and valid messages to the signal processor for algorithmically preventing signal processor read access to an individual message stored in wraparound receive memory until said individual message has been entirely and correctly received, said TC responsive to said outgoing signals in parallel form for providing to said RTI read access to said transmit memory but only to the signal process specified message in a block and for algorithmically preventing signal processor write access to the latest message in an individual block in said transmit memory if said RTI is read accessing said latest message and for otherwise being responsive to the storing of a word of a new message by said signal processor for transmission in said individual block and preventing RTI read access to said new message until said first word for transmission is stored by said signal processor in said individual block.

2. The apparatus of claim 1, further comprising:

clock means, for providing timed clock pulses; and time tag counter means, responsive to said incoming asynchronous bus signals and to command signals from the signal processor for counting said timed clock pulses in response to said command signals for providing the current value of the count of said time tag counter for insertion within a message in memory.

* * * * *

UNITED STATES PATENT AND TRADEMARK OFFICE
CERTIFICATE OF CORRECTION

PATENT NO. : 4,623,997

DATED : November 18, 1986

INVENTOR(S) : Bhalchandra R. Tulpule

It is certified that error appears in the above-identified patent and that said Letters Patent is hereby corrected as shown below:

Column 11, line 33.　　　After "2" insert -- and --

Signed and Sealed this

Tenth Day of November, 1987

Attest:

DONALD J. QUIGG

Attesting Officer

Commissioner of Patents and Trademarks